(12) United States Patent
Labrie

(10) Patent No.: US 7,725,433 B1
(45) Date of Patent: *May 25, 2010

(54) DATA NAVIGATION SYSTEM AND METHOD EMPLOYING DATA TRANSFORMATION LINEAGE MODEL

(75) Inventor: Jacques Joseph Labrie, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/221,542

(22) Filed: Dec. 28, 1998

Related U.S. Application Data

(60) Provisional application No. 60/072,550, filed on Jan. 26, 1998.

(51) Int. Cl.
*G06G 7/00* (2006.01)
*G06G 17/00* (2006.01)
(52) U.S. Cl. ...................... 707/612; 707/810
(58) Field of Classification Search ......... 707/100–200, 707/104.1, 3, 205, 6; 705/21–27; 710/200; 714/1–4; 709/219; 717/148
See application file for complete search history.

(56) References Cited

U.S. PATENT DOCUMENTS

| | | | | |
|---|---|---|---|---|
| 5,315,709 A | * | 5/1994 | Alston et al. | 707/6 |
| 5,630,125 A | * | 5/1997 | Zellweger | 707/103 |
| 5,717,925 A | | 2/1998 | Harper et al. | |
| 5,721,911 A | | 2/1998 | Ha et al. | |
| 6,021,508 A | * | 2/2000 | Schmuck et al. | 714/4 |
| 6,023,706 A | * | 2/2000 | Schmuck et al. | 707/200 |
| 6,032,216 A | * | 2/2000 | Schmuck et al. | 710/200 |
| 6,055,515 A | * | 4/2000 | Consentino et al. | 705/27 |
| 6,208,345 B1 | * | 3/2001 | Sheard et al. | 345/853 |
| 6,493,720 B1 | * | 12/2002 | Chu et al. | 707/104.1 |

OTHER PUBLICATIONS

L.M. Burns, et al., "A Graphical Entity—Relationship Database Browser", An IBM technical paper, Jan. 5-8, 1988.*

* cited by examiner

*Primary Examiner*—Etienne LeRoux
*Assistant Examiner*—Susan Chen
(74) *Attorney, Agent, or Firm*—Tucker Ellis & West LLP

(57) ABSTRACT

A method, apparatus, and article of manufacture for a transformation lineage model. Data stored on a data storage device connected to a computer is navigated. In response to receiving user input, a target object in an information catalog is selected. Then, information about a source from which the target object was derived is provided.

25 Claims, 8 Drawing Sheets

DATA NAVIGATION SYSTEM AND METHOD EMPLOYING DATA TRANSFORMATION LINEAGE MODEL

PROVISIONAL APPLICATION

This application claims the benefit of U.S. Provisional Application No. 60/072,550, entitled "TRANSFORMATION/LINEAGE MODEL," filed on Jan. 26, 1998, by Jacques J. Labrie, which is incorporated by reference herein.

CROSS-REFERENCE TO RELATED APPLICATIONS

This application is related to the following co-pending and commonly-assigned patent applications:

Application Ser. No. 09/221,042, entitled "METHOD AND SYSTEM FOR SYNCHRONIZATION OF METADATA IN AN INFORMATION CATALOG," filed on same date herewith, by Jing Huang Chu et al.;

U.S. Pat. No. 5,717,925, issued on Feb. 10, 1998, entitled "INFORMATION CATALOG SYSTEM WITH OBJECT-DEPENDENT FUNCTIONALITY," filed on Jun. 5, 1996, by Lloyd Harper et al., which is a continuation of application Ser. No. 08/135,355, filed on Oct. 8, 1993, by Lloyd Harper et al., which was abandoned on Jun. 5, 1996; and U.S. Pat. No. 5,721,911, issued on Feb. 24, 1998, entitled "MECHANISM FOR METADATA," filed on Jun. 25, 1996, by Khanh D. Ha et al.;

all of which applications are incorporated by reference herein.

BACKGROUND OF THE INVENTION

1. Field of the Invention

This invention relates in general to computer-implemented objects, and in particular, to maintaining object relationships.

2. Description of Related Art

Databases are computerized information storage and retrieval systems. A Database Management System (DBMS) stores and retrieves data in databases. Databases are organized into tables which consist of rows and columns of data. The rows are formally called tuples. A database will typically have many tables and each table will typically have multiple tuples and multiple columns. The tables are typically stored on random access storage devices (RASD) such as magnetic or optical disk drives for semi-permanent storage. A DBMS can be an object-oriented database management system (OODBMS). An object-oriented database is organized into objects having members that can be pointers to other objects.

Some systems store catalog objects using an information catalog. In particular, for each object to be cataloged, there is a corresponding metadata object in the information catalog describing the object. A metadata object contains metadata, which is information about other data. For example, metadata could be information that describes the name of a table or the location of a document, but it is not the actual data in the table or document. The metadata for an object in the information catalog may change over time. Currently, it is difficult to identify the changes that occurred.

Thus, there is a need in the art for a technique for determining the transformation lineage of data.

SUMMARY OF THE INVENTION

To overcome the limitations in the prior art described above, and to overcome other limitations that will become apparent upon reading and understanding the present specification, the present invention discloses a method, apparatus, and article of manufacture for a transformation lineage model.

According to the present invention, data stored on a data storage device connected to a computer is navigated. In response to receiving user input, a target object in an information catalog is selected. Then, information about a source from which the target object was derived is provided.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Hardware Environment

Figure 1:
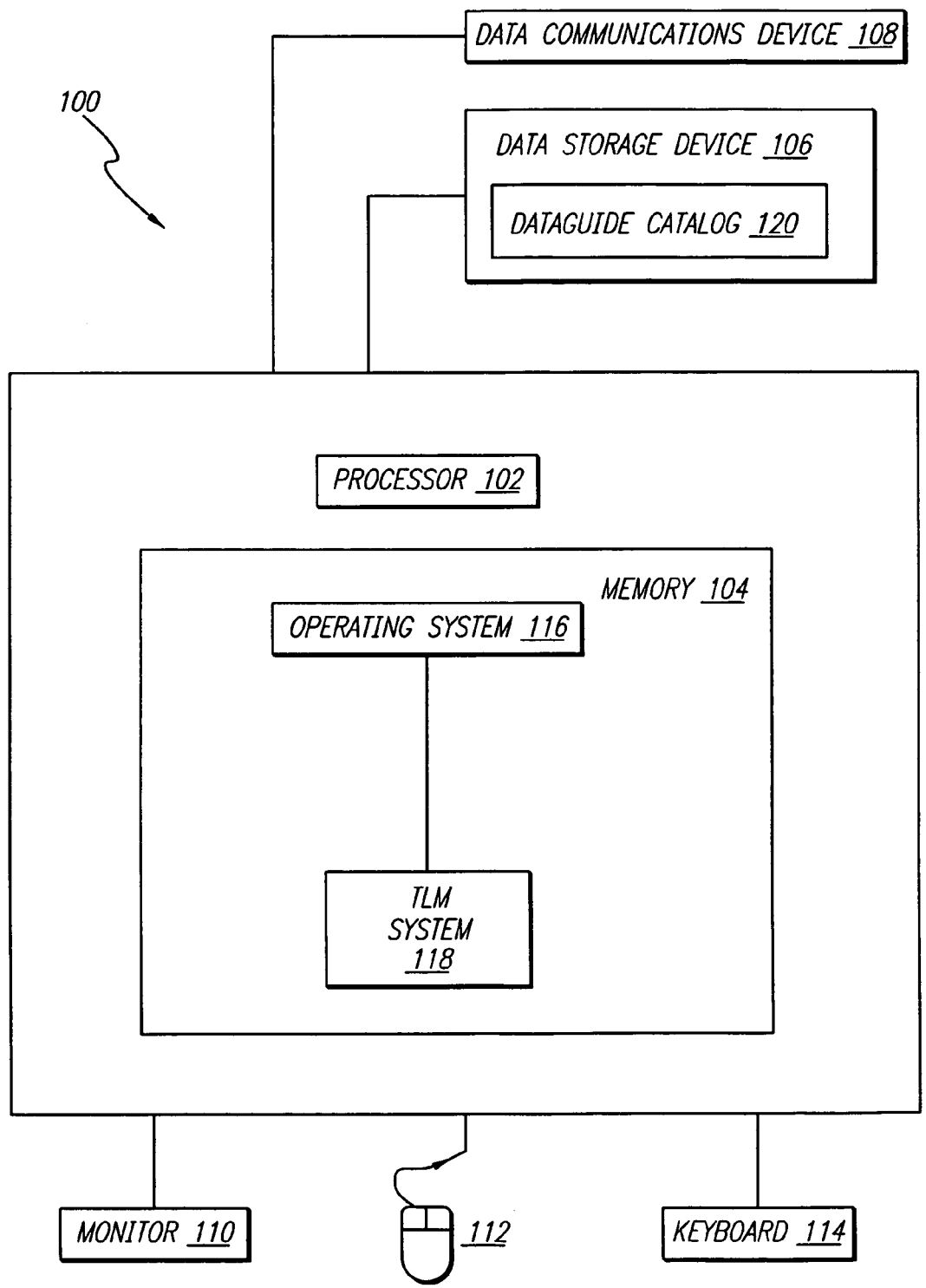
FIG. 1 is an exemplary hardware environment used to implement the preferred embodiment of the invention.

FIG. 1 is an exemplary hardware environment used to implement the preferred embodiment of the invention. The present invention is typically implemented using a computer 100, which generally includes, inter alia, a processor 102, random access memory (RAM) 104, data storage devices 106 (e.g., hard, floppy, and/or CDROM disk drives, etc.), data communications devices 108 (e.g., modems, network interfaces, etc.), monitor 110 (e.g., CRT, LCD display, etc.), mouse pointing device 112 and keyboard 114. It is envisioned that attached to the computer 100 may be other devices such as read only memory (ROM), a video card, bus interface, printers, etc. Those skilled in the art will recognize that any combination of the above components, or any number of different components, peripherals, and other devices, may be used with the computer 100.

The computer 100 operates under the control of an operating system (OS) 116, such as MVS™, AIX™, OS/2™, WINDOWS NT™, WINDOWS™, UNIX™, etc. The operating system 116 is booted into the memory 104 of the computer 100 for execution when the computer 100 is powered-on or reset. In turn, the operating system 116 then controls the execution of one or more computer programs 118 by the computer 100. The present invention is generally implemented in these computer programs 118, which execute under the control of the operating system 116 and cause the computer 100 to perform the desired functions as described herein. Alternatively, the present invention may be implemented in the operating system 116 itself.

The operating system 116 and computer programs 118 are comprised of instructions which, when read and executed by the computer 100, causes the computer 100 to perform the steps necessary to implement and/or use the present invention. Generally, the operating system 116 and/or computer programs 118 are tangibly embodied in and/or readable from a device, carrier, or media, such as memory 104, data storage devices 106, and/or a remote device coupled to the computer 100 via the data communications devices 108. Under control of the operating system 116, the computer programs 118 may be loaded from the memory 104, data storage devices 106, and/or remote devices into the memory 104 of the computer 100 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Overview

One embodiment of the present invention provides a Transformation Lineage Model ("TLM") System 118. The TLM System 118 allows an information catalog user to determine the lineage of warehouse data. Warehouse data refers to a large amount of data stored on a data storage device. Warehouse data may be stored in a database. The TLM system provides a transformation model. In particular, the TLM system provides a structure, such as a tree structure, with objects or data on nodes of the tree. A user can select a node of the tree to obtain information about the lineage of the data at that node. Lineage refers to the source of the data or the modification that resulted in the current state of the data.

Information Catalog System

The information catalog system may be DataGuide™, a product from International Business Machines Corporation, Armonk, N.Y. The information catalog system is further described in the above cross-referenced applications. An overview of the information catalog will be provided for better understanding of the metadata synchronizer.

The information catalog system enables users to find out what data is available in a corporate environment. In particular, the information catalog system enables categorization. This allows users to add their own terminology to existing names for objects, including full names and information about what is stored. Also, the information catalog system enables users to organize information better in, for example, a flat list or tree structure. Also, the information catalog system enables users to access the data itself.

The information catalog system allows knowledge workers to define metadata (or "meta information") of objects types and object instances corresponding to information managed by one or more data storage resources under the control of one or more data processing nodes. The user-defined object types are customizable and extendable by knowledge workers or data processing administrators familiar with the objects. The users determine what information should be captured, what it is to be called, and how it is organized. The information catalog has no prior knowledge of the object types users will generate. However, the information catalog supports the user-generated object type with a defined set of information catalog functional services that are appropriate to the object types generated by users.

The information catalog system defines a plurality of functional categories within which the user-defined object types may be generated. Each functional category represents a categorization and/or subclassing of a super class of functional services provided by the information catalog. The functional categories to which the object types are assigned become part of the object type definition and limit the functions available to each object type. An object type is a data structure that may be thought of as a subclass object that encapsulates the functions inherited from the category class to which the object type belongs, together with one or more property attributes corresponding to information that the knowledge worker wishes to catalog. The object types can be populated with object instances that are generated by assigning values to the property attributes to create meta information objects that uniquely identify units of information to be cataloged by the knowledge worker.

In the information catalog, the functional categories to which the object types may be assigned may include, but are not limited to, a "Grouping" category, an "Element" category, a "Program" category, a "Dictionary" category, a "Contact" category, and a "Support" category. For example, the "Grouping" category may contain a "Business Group" object type and a "Tables" object type.

All of the user-defined object types of the information catalog are placed in one of these six categories. Each category represents a distinct set of product functionality, such as "Information" objects corresponding to information from one or more data storage resources to be cataloged and "Support" objects corresponding to information that supports the cataloging of information defined by the Information objects.

Figure 2:
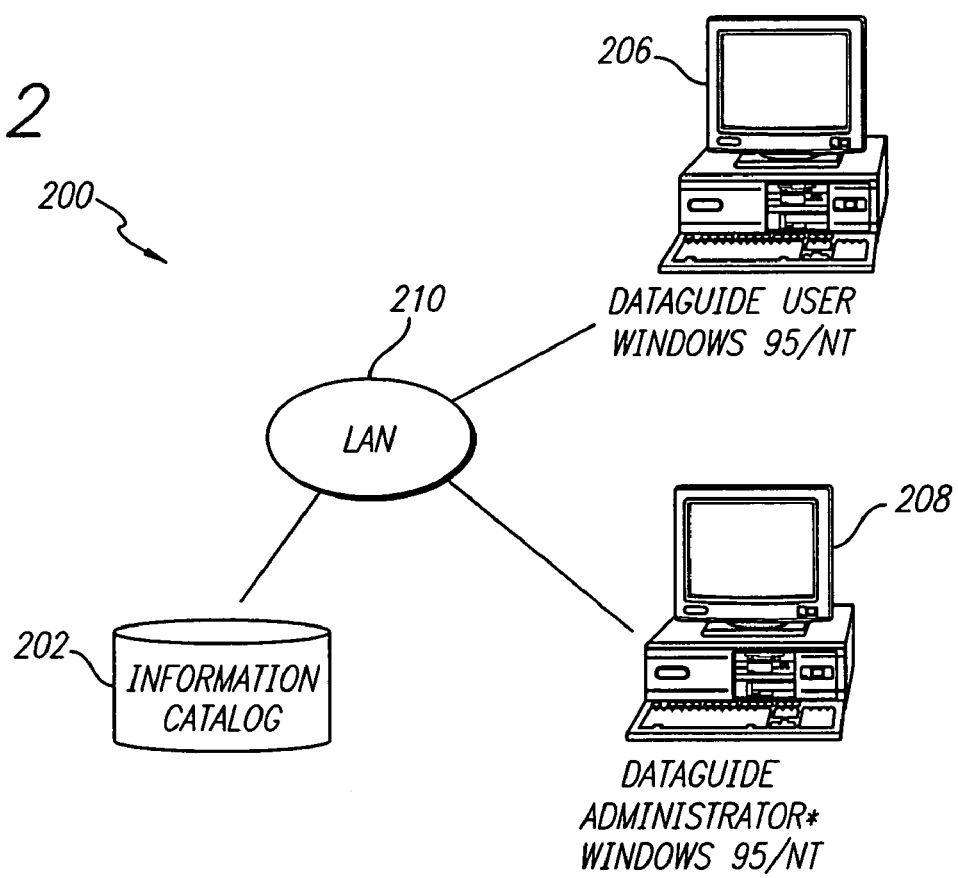
FIG. 2 illustrates a network of computers sharing an information catalog.

FIG. 2 illustrates a network 200 of computers sharing an information catalog 202. The information catalog 202 ("information catalog") contains metadata objects. The computers 206 and 208 are connected via a local area network ("LAN") 210 to each other and to the information catalog 202. The information catalog system resides on each of the computers 206 and 208. The information catalog system may reside on different platforms, including, but not limited to, a Windows 95/NT™ system 206 and 208.

The information catalog system may be used to catalog business information. When searching for information to solve business problems, users want to find the quickest and easiest route to the information. Users can do their searching with the information catalog system, without ever leaving their desktop. The information catalog system can be used in organizations of any size to catalog business information and make it available to anyone who needs it. Thus, the information catalog system enables multiple people to share information.

The information catalog system has powerful searching capabilities to help users locate information quickly and easily. Users can search on keywords, values, and types of information. Users can save searches to reuse at any time. Running saved searches enables users to view the most current information. Users can place saved search results on a desktop for easy future reference, thus avoiding redundant searches.

Figure 3:
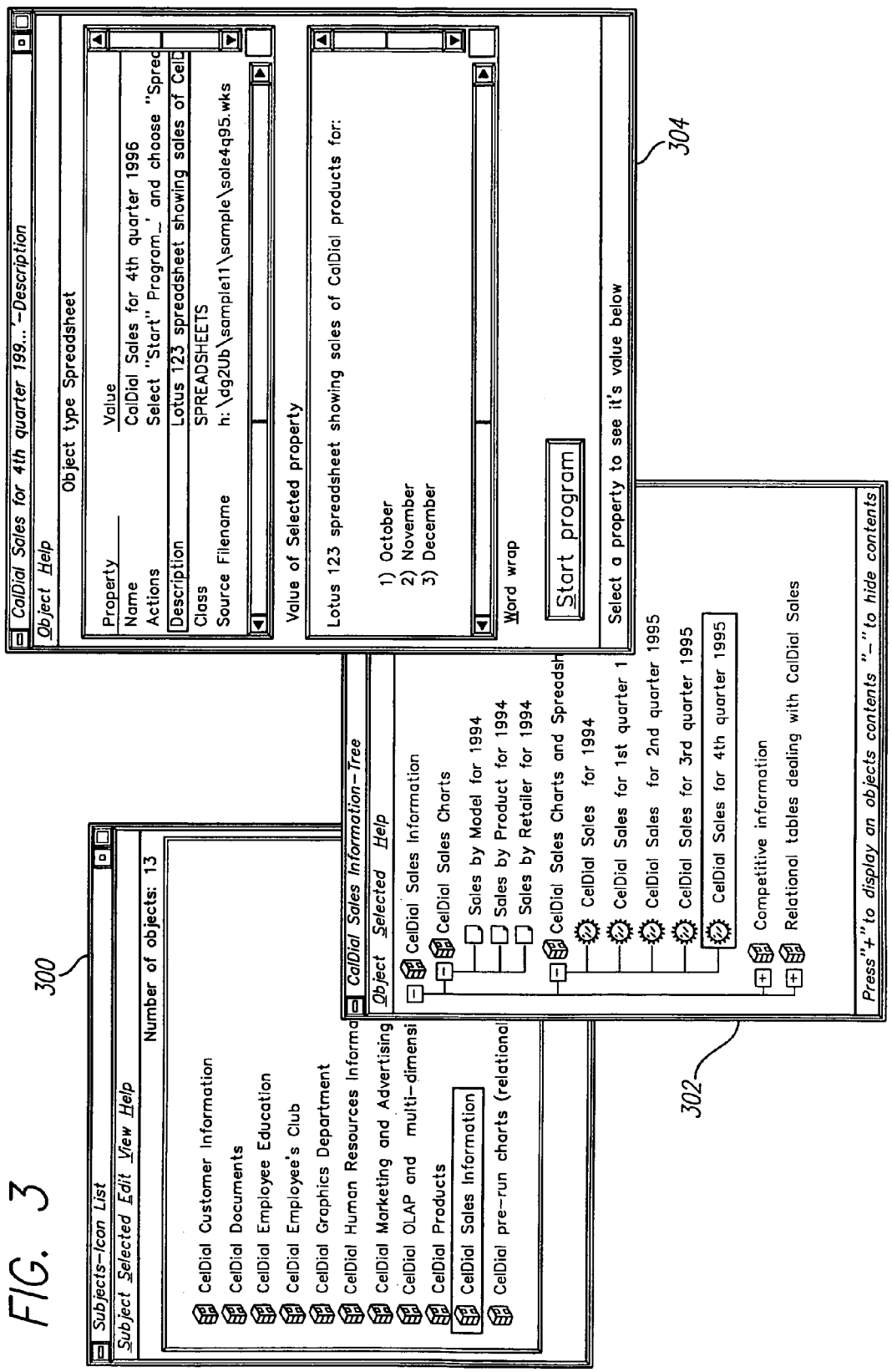
FIG. 3 illustrates the logical structure of the information catalog.

The information catalog system enables users to browse information that is available. Information is organized into a logical structure so users can locate the information needed. Users can use the built-in icon legend for quick reference to the types of information available, such as spreadsheets, charts, reports, tables, queries, images, video, and more. FIG. 3 illustrates windows 300, 302, and 304 that illustrate the logical structure of the information in the information catalog. By double clicking on an object displayed in one of the windows; 300, 302, and 304, a user obtains additional detail of that object.

For end users, the information catalog system provides a starting point for accessing information. It speeds users toward problem solving, and away from duplicate efforts to recreate what already exists. For information systems professionals, the information catalog system offers client/server efficiency, improves user satisfaction and frees up valuable time to focus on critical issues. For organizations, the information catalog system helps eliminate redundancy and expense, while extending the value of existing information resources.

The information catalog system helps users quickly set up an information catalog and customize the information catalog for an organization's needs. A comprehensive set of extractor utilities paves the way for users to access a wide variety of information sources. Users can build a glossary of special terms and jargon to support the use of consistent terminology throughout the users' company. The information catalog system lets users provide a list of information contacts to help others know where to go for more assistance. It also provides a news facility to quickly notify users of any updates to the information catalog system information.

Figure 4:
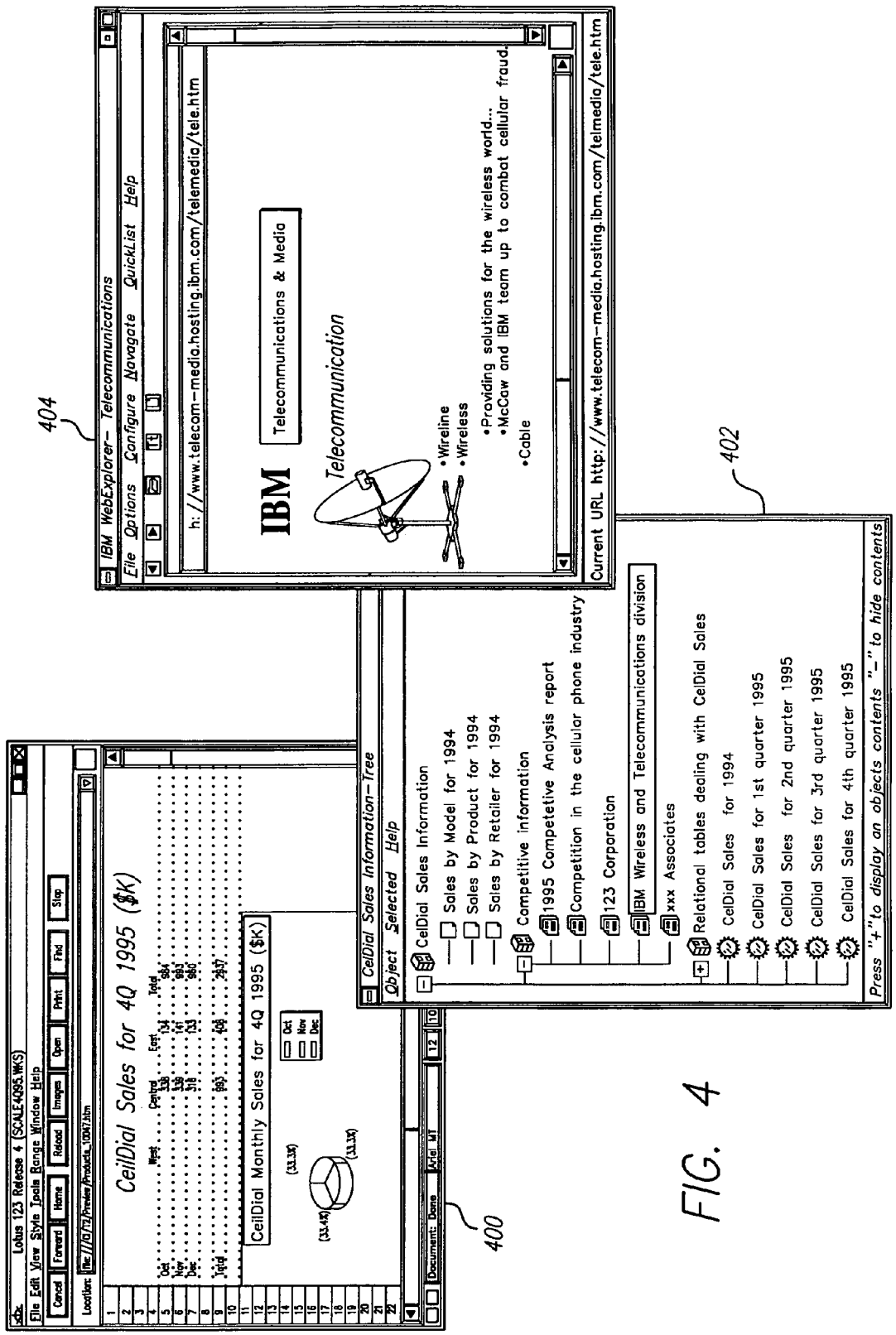
FIG. 4 illustrates windows displayed by the information catalog system.

The information catalog system leverages users' information investments by using the information catalog system to merge the power of mainframe and mid-size computers with the convenience of client/server technology. The information catalog system not only finds information, it also gives users the option to launch the desktop applications they use to process the information. FIG. 4 illustrates windows 400, 402, and 404 displayed by the information catalog system. The data catalog system enables users to start a program to retrieve and work with information, such as a spreadsheet of sales figures as in window 400. Additionally, users can use Uniform Resource Locators (URLs) to catalog home pages with the information catalog system as illustrated in windows 402 and 404.

The information catalog system can be used with a variety of popular software products, IBM and non-IBM, that users may already have. It is part of a complete solution that brings the information needed to the user's desktop. The information catalog system information is stored on DB2™, a database management system from IBM. The information catalog system provides a work group solution for information sharing. The information catalog system enables staff and management teams to locate key business information no matter where it is stored in the enterprise. The information catalog system provides an information catalog current and consistent information throughout the company. The information catalog system launches decision support and desktop tools to access data. The information catalog system provides an integration point with multiple vendors, such as Business Objects™.

The information catalog system makes it possible to determine what information is available, where it resides, what it means, what form it's in, who can provide additional information or assistance in regard to it, and how it is produced. It puts productivity, flexibility and manageability on the desktop of the Management and other Business Users.

The information catalog system provides a powerful business-oriented solution to help end users locate, understand, and access enterprise data. In client/server information catalogs, business metadata (data about data) can be described in business terms, organized into subject areas, and customized for a user workgroup's or enterprise's needs. The information catalog system is an Data Warehouse facility for integrating and managing end-user business metadata.

The information catalog system enables users to: locate data in the information catalog by keyword text search or navigation ("drill down") through a subject area and business groupings, to understand data by browsing metadata descriptions in business terms, and to access the data by launching applications directly from the information catalog system. Additionally, the information catalog system communicates comments and corrections on metadata descriptions to the information catalog system administrator via a comments object and shares administration of the information catalog system information catalog (when authorized).

The information catalog system provides an easy-to-use graphic interface in either the Microsoft Windows NT environment, the Windows 95 environment, or through the World Wide Web ("WWW" or "Web"). The information catalog system shares the same information catalogs with other the information catalog system users across a LAN or enterprise and identifies the owners for data via the contact object.

Transformation Lineage Model

The TLM system 118 provides a mechanism which allows a user to determine the lineage of warehouse data by traversing a transformation model. TLM system 118 provides users with a tree structure that represents the data the users wish to view. The TLM system 118 allows users to select any data that they want to access, which can be anywhere on the tree. If the users have questions about how the data they are looking at was derived, the users can navigate the information catalog via the tree structure to see any "transformations" that were applied to generate the data. From this point, the users can continue with their data analysis or continue to follow the lineage by looking at the metadata about the source data. This TLM system 118 allows users to drill from the target warehouse data back to the original source data and learn how the target warehouse data was derived.

The TLM system 118 is especially advantageous in that it is used to describe a process applied to data. The TLM system 118 describes the transformation of data as it moves in a data warehouse. Moreover, the TLM system 118 defines the lineage of data. That is, the TLM system 118 indicates to the user what the sources for the warehouse were.

The TLM system 118 may be used, for example, to determine that there is a problem with the target data. A user using the TLM system 118 can drill down to the source data, which may indicate that some of the source data is missing or that incorrect data was submitted from the source. This information provided by the TLM system 118 enables the user to correct the source data. The TLM system 118 can tie any objects together, for example, database tables or spreadsheets created by different users.

In particular, the user may register objects for which metadata is to be maintained in an information catalog from a graphical user interface ("GUI") for the Visual Warehouse™ product, which is a product from International Business Machines, Corporation, Armonk, N.Y. Once these objects are registered, changes in the metadata of the objects at their source or tool (e.g., at the Visual Warehouse™) are detected by a metadata synchronizer on a timed basis. The metadata synchronizer will refresh metadata in the information catalog supported by the information catalog system.

Figure 5:
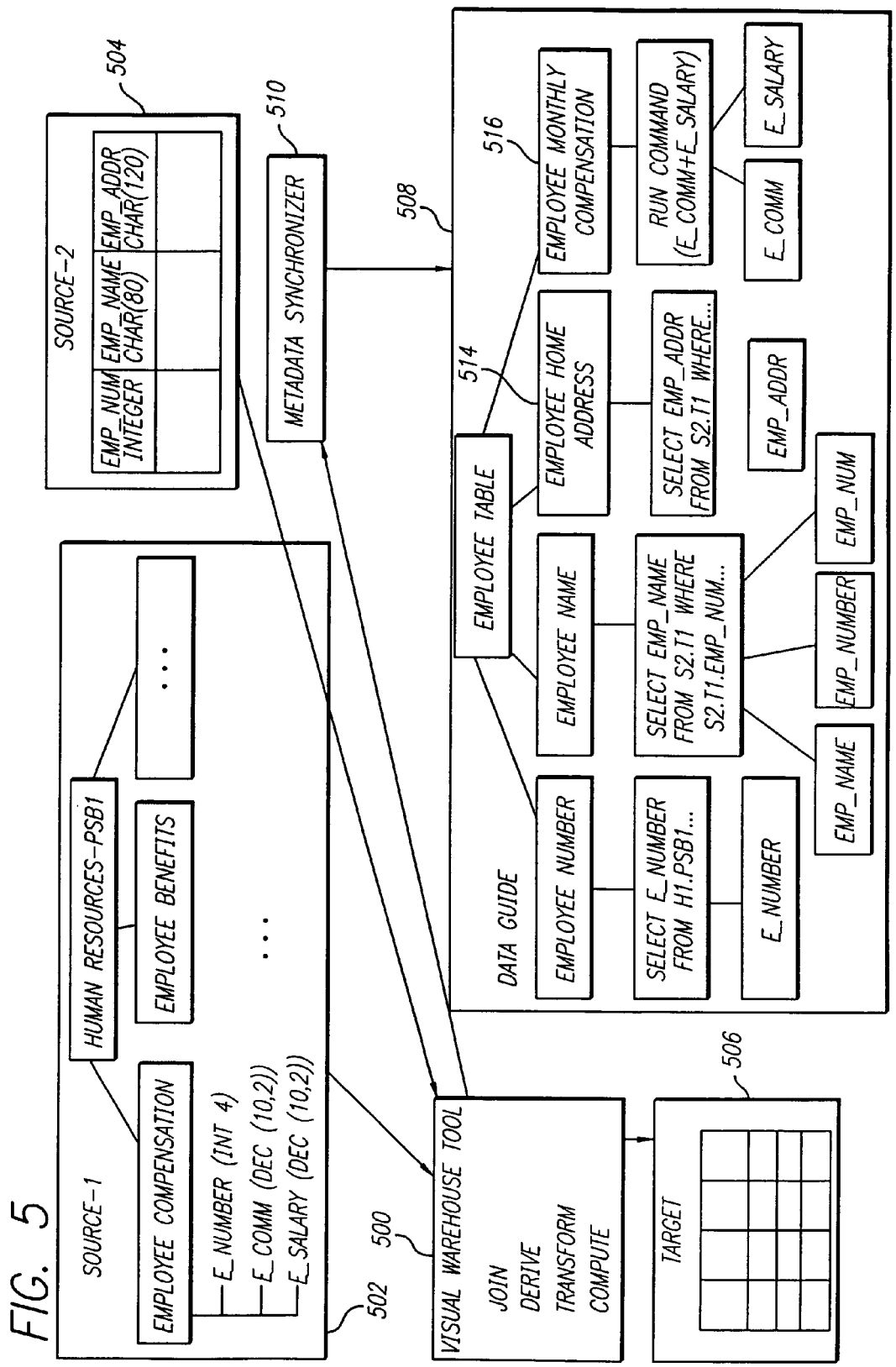
FIG. 5 is a block diagram illustrating an information catalog.

FIG. 5 is a block diagram illustrating an information catalog 508. The Visual Warehouse™ tool 500 takes data from Source-1 502 and/or Source-2 504 and modifies or adds to data in the Target 506. The Visual Warehouse' tool 500 can perform various operations on the source data, including, but not limited to, joining tables, deriving information, transforming data, and computing a value. Source-1 502 contains an object having a tree structure and containing employee information. Source-2 504 contains a table object of employee information. The Visual Warehouse™ tool 500, for example, can operate on the objects of Source-1 502 and Source-2 504 to modify a table object in the Target 506.

DataGuide™ displays an information catalog 508, represented with a tree structure and identifying objects that have been registered with DataGuide™. Some of the objects include employee information objects, such as an employee's address ("Employee Home Address") 514 or an employee's number ("Employee Number") 512. The Visual Warehouse™ tool 500 may have modified the metadata for the employee's number from Source-1 and the employee's address from Source-2. The metadata synchronizer 510 monitors the Visual Warehouse™ tool 510, detects that metadata for objects registered with DataGuide™ has changed, and updates the metadata in the information catalog 508 to reflect the changes.

The TLM system 118 enables a user to select an object in the information catalog 508. Selection can occur, for example, by using an input device, such as a mouse, to point at and click on the object to be selected. For example, if a user selected the Employee Number object 512 in the information catalog 508, the TLM system 118 would provide lineage information indicating that the source of this data is Source-1 502. If a user selected the Emp_Addr object 514 in the information catalog 508, the TLM system 118 would provide lineage information indicating that the source of this data is Source-2 504. Moreover, if a user selected the Employee Monthly Compensation Salary object 516, the TLM system 118 could drill down to provide the derivation of the data for this object 516.

Figure 6:
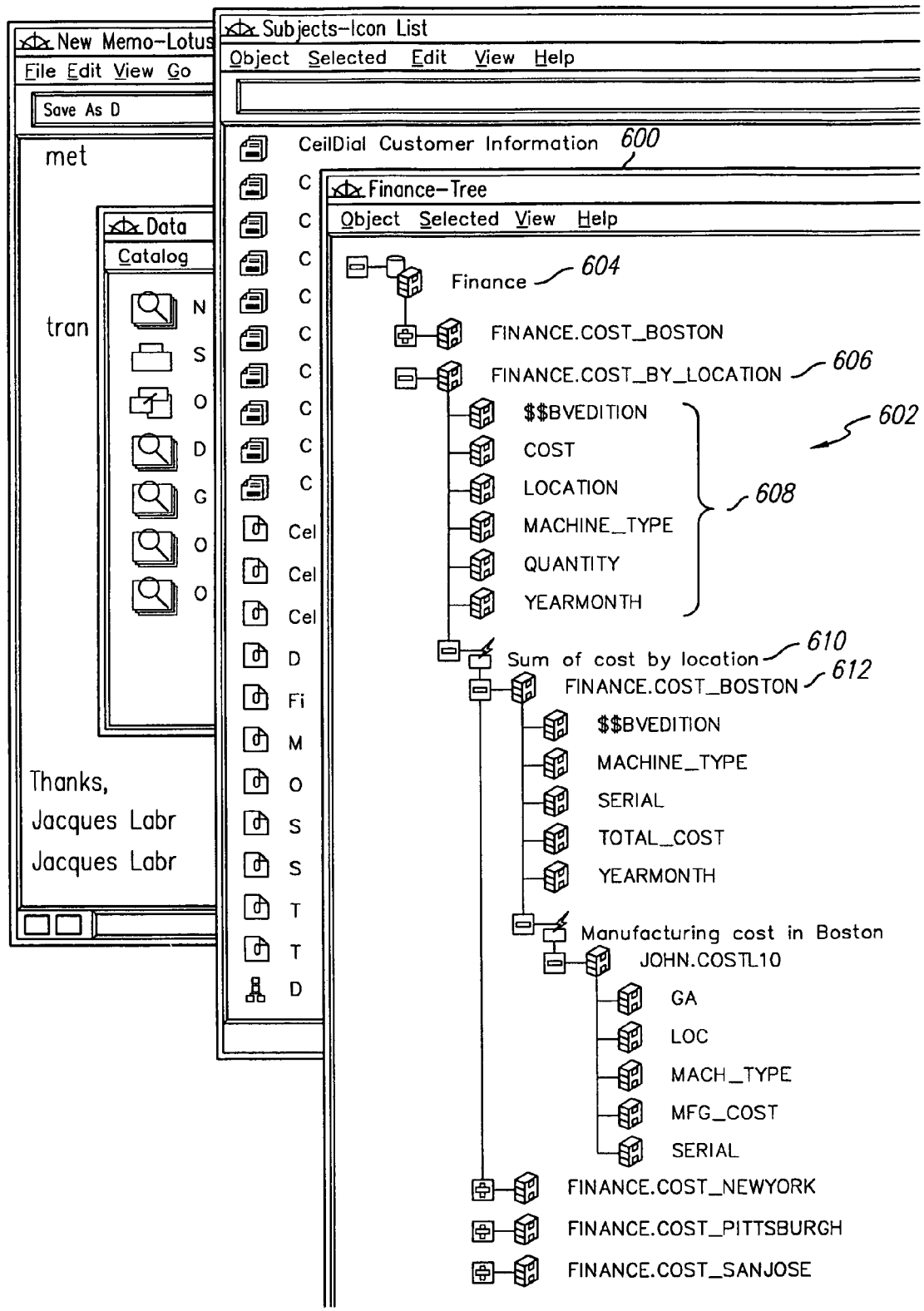
FIG. 6 is a diagram illustrating a Window containing a tree structure representing objects in an information catalog.

FIG. 6 is a diagram illustrating Window 600 containing a tree structure representing objects in an information catalog. The tree 602 has nodes that represent the objects in the information catalog. The "Finance" node 604 represents a target warehouse database containing financial data. When a user selects the "Finance" node 604, the TLM system 118 drills down to the "FINANCE.COST_BY_LOCATION" node 606, which represents a target table.

When a user selects the "FINANCE.COST_BY_LOCATION" node 606, the TLM system 118 drills down to show the target columns for this table 608 along with a transformation producing function represented by the "Sum of cost by location" node 610. The transformation producing function transforms data, for example, by summing values. In particular, the transformation producing function represented by the "Sum of cost by location" node 610 produces "FINANCE.COST_BY_LOCATION" data. For example, the "FINANCE.COST_BOSTON" node 612 shows finance costs for the location Boston. The "Sum of cost by location" node 610 also can contain the details of the transformation itself (e.g., the SQL or program logic that modified the source).

The TLM system 118 displays the "FINANCE.COST_BOSTON" node 612 when a user selects the "Sum of cost by location" node 610. The "FINANCE.COST_BOSTON" node 612 represents the source table used in the transformation producing function. Similarly, a user could continue to obtain transformation and lineage information by navigating the information catalog represented by tree 602.

Figure 7:
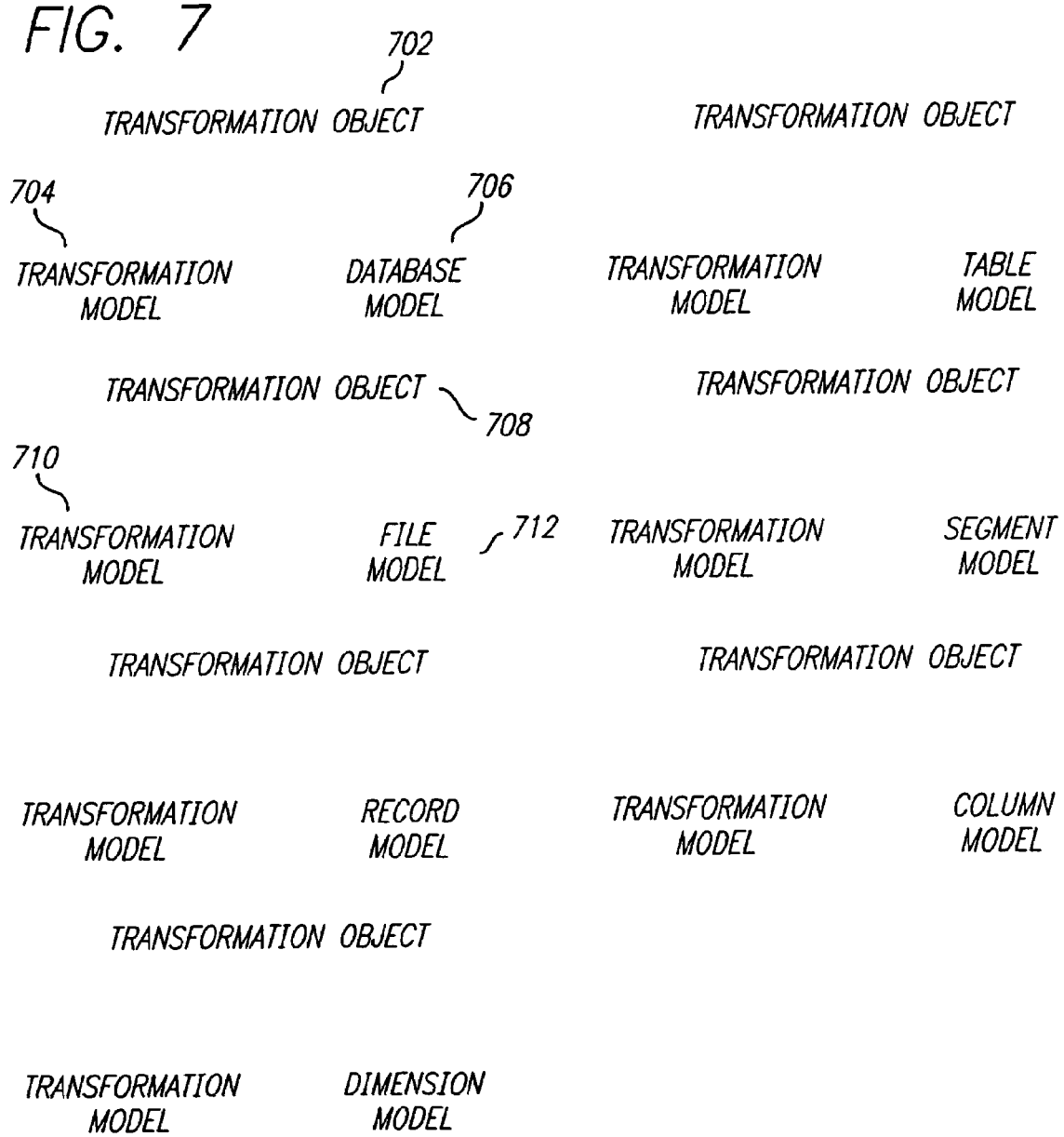
FIG. 7 illustrates the transformation models used by the transformation lineage model (TLM) system of the present invention.

FIG. 7 illustrates the transformation models used by the TLM system 118. A user views a graphical tree structure representing data from the target, which was derived from a source, via transformations. However, the TLM system 118 internally maintains transformation models that are used to provide a user with the capability to determine the lineage of warehouse data from its original source to the final target table in the data warehouse. For example, for one transformation object 702, the transformation model 704 is a database model 706. Similarly, for transformation object 708, the transformation model 710 is a file model 712. These objects and models contain the information that the TLM system 118 uses to provide a user with lineage information. For example, the TLM system 118 can use the transformation models to maintain information about the source of data in a target.

Figure 8:
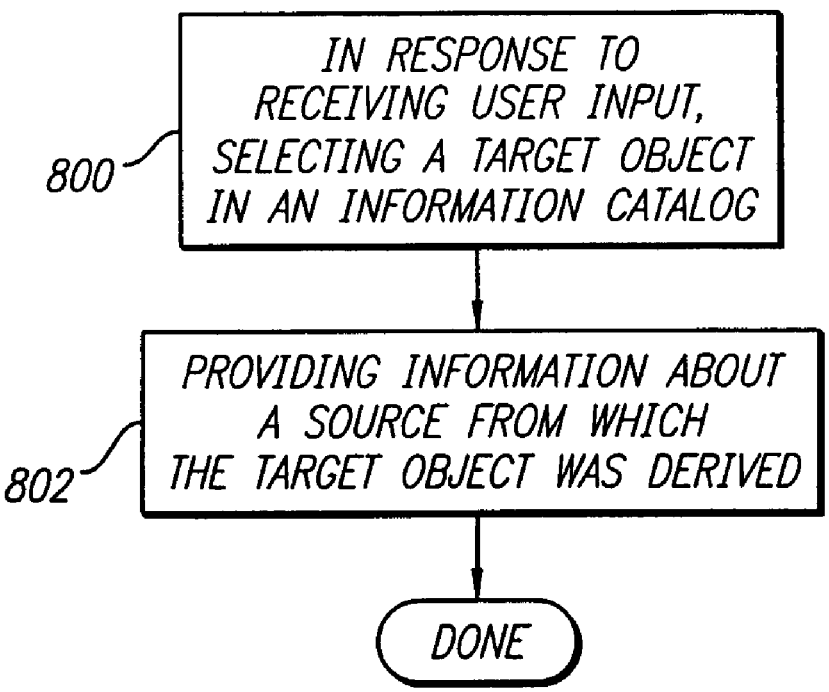
FIG. 8 is a flow diagram illustrating the steps performed by the TLM system to provide transformation and lineage information to a user.

FIG. 8 is a flow diagram illustrating the steps performed by the TLM system 118 to provide transformation and lineage information to a user. In Block 800, in response to receiving user input, the TLM system 118 selects a target object in an information catalog. In Block 802, the TLM system 118 provides information about a source from which the target object was derived.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of navigating data stored on a data storage device connected to a computer, the method comprising:
   registering first source data in an information catalog, wherein the catalog defines a plurality of functional objects for creating user-defined object types;
   in response to receiving input from a user navigating a plurality of data objects stored in the information catalog, selecting a first target data object in the information catalog;
   providing transformation lineage information about the first source data from which the first target data object was derived via a transformation performed on the first source data to derive the first target data object;
   providing transformation model information of the transformation performed on the first source data to derive the first target data object, the transformation model information providing a user with transformation producing function information of the first target data object including a derivation of the first target data object from the first source data;
   using a metadata synchronizer, detecting a change in the registered first source data as changed source data, and selectively refreshing metadata in the information catalog to reflect the detected change;

registering the changed source data in the information catalog;

selecting a second target data object, the second target data object being related to the changed source data by the transformation performed on the changed source data to derive the second target data object; and, providing updated transformation lineage information about the changed source data from which the second target data object was derived via the transformation performed on the changed source data to derive the second target data object.

2. The method of claim 1, further including representing the target data object as a node in a tree structure.

3. The method of claim 1, wherein the providing information further includes providing transformation information, said transformation information comprising information about a transformation performed on said source data to derive said target data object.

4. The method of claim 3, wherein the providing said transformation information further comprises identifying a transformation producing function used to transform said source data.

5. The method of claim 1, wherein the providing said information further comprises providing lineage information which identifies said source data.

6. The method of claim 5, further comprising the maintaining transformation models for use in providing the lineage information, said transformation models maintaining information about the source data of the target data object.

7. The method of claim 1, wherein the selectively refreshing the metadata in the information catalog includes selectively refreshing the metadata in the information catalog to reflect the detected change over a timed basis.

8. An apparatus for navigating data, comprising:
a computer having a memory and a data storage device coupled thereto that stores the data in an information catalog; and,
one or more computer programs, performed by the computer, for:
registering first source data in an information catalog, wherein the catalog defines a plurality of functional objects for creating user-defined object types;
in response to receiving input from a user navigating the data stored in the information catalog, selecting a first target data object stored in the information catalog;
providing transformation lineage information about the first source data from which the first target data object was derived via a transformation performed on the first source data;
providing transformation model information of the transformation performed on the first source data to derive the first target data object, the transformation model information providing a user with transformation producing function information of the first target data object including a derivation of the first target data object from the first source data;
using a metadata synchronizer, detecting a change in the registered first source data as changed source data, and selectively refreshing metadata in the information catalog to reflect the detected change;
registering the changed source data in the information catalog;
selecting a second target data object, the second target data object being related to the changed source data by the transformation performed on the changed source data to derive the second target data object; and,
providing updated transformation lineage information about the changed source data from which the second target data object was derived via the transformation performed on the changed source data to derive the second target data object.

9. The apparatus of claim 8, wherein the target data object is represented as a node in a tree structure.

10. The apparatus of claim 8, wherein said one or more computer programs comprise means for providing transformation information, said transformation information comprising information about a transformation performed on said source data to derive said target data object.

11. The apparatus of claim 9, wherein the transformation information identifies a transformation producing function used to transform said source.

12. The apparatus of claim 8, wherein said one or more computer programs comprise means for providing lineage information which identifies said source data.

13. The apparatus of claim 12, further comprising means for maintaining transformation models for use in providing the lineage information, said transformation models maintaining information about the source data of the target data object.

14. The apparatus of claim 8, wherein the selectively refreshing the metadata in the information catalog to reflect the detected change includes selectively refreshing the metadata in the information catalog over a timed basis.

15. An article of manufacture comprising a program storage medium readable by a computer and embodying one or more instructions executable by the computer to perform a method for navigating data stored in an information catalog on a data storage device, the method comprising:
registering first source data in an information catalog, wherein the catalog defines a plurality of functional objects for creating user-defined object types;
in response to receiving input from a user navigating a plurality of data objects stored in the information catalog, selecting a first target data object stored in the information catalog, the first target data object being derived by a transformation performed on first source data;
providing transformation lineage information about the first source data from which the first target data object was derived;
providing transformation model information of the transformation performed on the first source data to derive the first target data object, the transformation model information providing a user with transformation producing function information of the first target data object including a derivation of the first target data object from the first source data;
using a metadata synchronizer, detecting a change in the registered first source data as changed source data, and selectively refreshing metadata in the information catalog to reflect the detected change;
registering the changed source data in the information catalog;
selecting a second target data object, the second target data object being related to the changed source data by the transformation performed on the changed source data to derive the second target data object; and,
providing updated transformation lineage information about the changed source data from which the second target data object was derived via the transformation performed on the changed source data to derive the second target data object.

16. The article of manufacture of claim 15, wherein the target data object is represented as a node in a tree structure.

17. The article of manufacture of claim 15, wherein the providing information further comprises providing transformation information, said transformation information comprising information about a transformation performed on said source data to derive said target data object.

18. The article of manufacture of claim 17, wherein the providing transformation information further comprises identifying a transformation producing function used to transform said data source.

19. The article of manufacture of claim 15, wherein the providing said information further comprises providing lineage information which identifies said source data.

20. The article of manufacture of claim 19, wherein said method further comprises maintaining transformation models for use in providing the lineage information, said transformation models maintaining information about the source data of the target data object.

21. The article of manufacture of claim 15, wherein the selectively refreshing the metadata in the information catalog to reflect the detected change includes selectively refreshing the metadata in the information catalog over a timed basis.

22. A computer-readable medium having contents for, when executed, causing a computer-based information handling system to perform a method for navigating data in a data warehouse stored in a data storage device connected to a computer-based information handling system, the method comprising:

registering one or more first sources of data in an information catalog, wherein the catalog defines a plurality of functional objects for creating user-defined object types;

receiving input from a user navigating a plurality of data objects stored in the data warehouse selecting a first target data object, said the first target data object derived by one or more transformations performed on the one or more first sources of data;

selecting the first target data object in response to receiving said user input;

providing transformation lineage information about at least one of said one or more first sources of data;

providing transformation model information of the one or more transformations performed on the one or more first sources of data to derive the first target data object, the transformation model information providing a user with transformation producing function information of the first target data object including a derivation of the first target data object from the one or more first sources of data;

using a metadata synchronizer, detecting a change in the registered one or more first sources of data as changed source data, and selectively refreshing metadata in the information catalog to reflect the detected change;

registering the changed source data in the information catalog;

selecting a second target data object, the second target data object being associated with the changed source data by the one or more transformations performed on the changed source data to derive the second target data object; and, providing updated transformation lineage information about the changed source data from which the second target data object was derived via the one or more transformations performed on the changed source data to derive the second target data object.

23. The computer readable medium according to claim 22, wherein the selectively refreshing the metadata in the information catalog to reflect the detected change includes selectively refreshing the metadata in the information catalog over a timed basis.

24. A system for navigating data in a data warehouse stored in a data storage device connected to a computer-based information handling system, the system for navigating data comprising:

a plurality of data objects, including a first target data object, the first target data object derived via one or more transformations performed on one or more first sources of data;

a transformation lineage system which stores transformation lineage information for the first target data object, the transformation lineage information associating the first target data object with the one or more transformations and identifying the one or more first sources of data;

a user interface for receiving user input for selecting of the first target data object;

said user interface configured to display the transformation lineage information in response to receiving user input selecting the first target data object;

a transformation model information system which provides information of the one or more transformations performed on the one or more first sources of data; and, a metadata synchronizer configured to detect a change in the one or more first sources of data as changed one or more sources of data and to selectively refresh metadata in the transformation lineage system to reflect the detected change, wherein the transformation lineage system is configured to provide updated transformation lineage information about the changed one or more sources of data in response to selection of a second target data object, the second target data object being related to the changed one or more sources of data by the one or more transformations performed on the changed one or more sources of data to derive the second target data object.

25. The system for navigating data according to claim 24, wherein the metadata synchronizer is configured to selectively refresh the metadata in the transformation lineage system over a timed basis.

* * * * *